April 8, 1930.　　　　R. L. TULLIS　　　　1,753,674
BIRD CAGE
Filed April 7, 1927　　　2 Sheets-Sheet 1

Inventor
Ross L. Tullis,
By Rockwee + Bartholow
Attorneys

April 8, 1930.   R. L. TULLIS   1,753,674
BIRD CAGE
Filed April 7, 1927   2 Sheets-Sheet 2
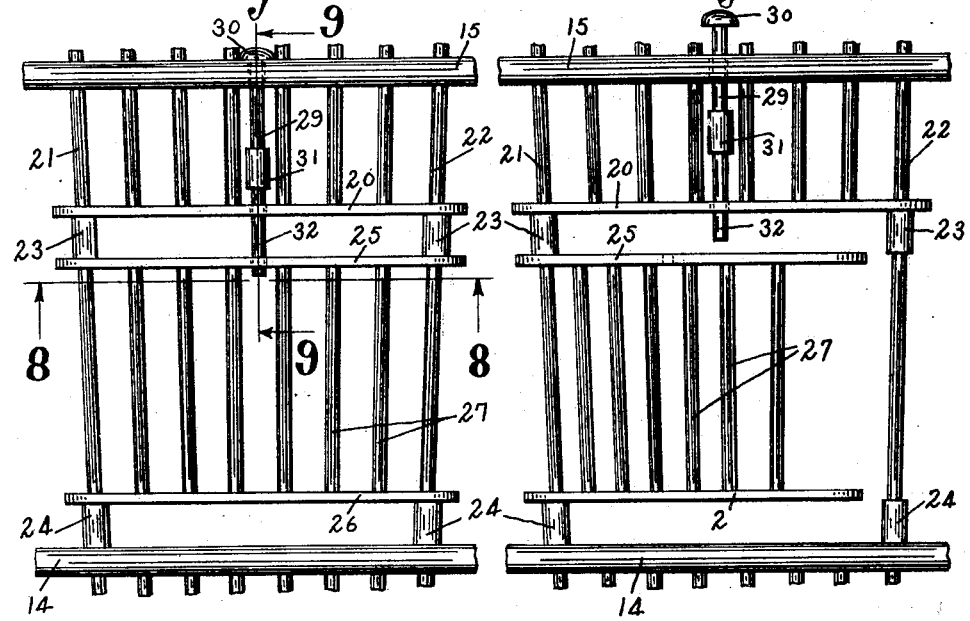

Patented Apr. 8, 1930

1,753,674

UNITED STATES PATENT OFFICE

ROSS L. TULLIS, OF NEW HAVEN, CONNECTICUT, ASSIGNOR TO THE ANDREW B. HENDRYX COMPANY, OF NEW HAVEN, CONNECTICUT, A CORPORATION OF CONNECTICUT

BIRD CAGE

Application filed April 7, 1927. Serial No. 181,818.

This invention relates to bird cages, and the embodiment which I have selected to illustrate and describe is a cage made up of cellulose esters material, such as pyralin. Cages made of this material have many advantages, for example, the possibility of constructing them in a great variety of colors and combinations of colors, the high luster which may be given them so as to add to their ornamental and attractive appearance, and the fact that they may be readily cleansed and kept in a clean, sanitary condition. Moreover, the nature of this material is such that the cross members of the cage may be very easily joined together by the use of a solvent which causes the material to flow together and unite so as to form a substantially one-piece structure. The invention is not limited, however, to the use of this material.

One object of the invention is to provide a bird cage structure of sanitary character, attractive in appearance, and convenient to use and in which the interior parts are readily accessible for cleaning.

Another object of my invention is to improve the construction of the lower section or bottom of the cage.

A still further object of the invention is to provide improved latching means for securing the bottom of the cage to the body portion thereof.

Still other objects of this invention are to provide an improved door, improved door locking means, improved feed cup holders, and means for mounting the same.

To these and other ends, the invention consists in the novel features and combinations of parts to be hereinafter described and claimed.

In the accompanying drawings:

Fig. 5 is an enlarged front elevation of the cage door;

Fig. 6 is the same as Fig. 5, with the exception that the door is shown in unlatched and partly open position;

Fig. 7 is a section on line 7—7 of Fig. 2;

Fig. 8 is a section on line 8—8 of Fig. 5;

Figure 1:
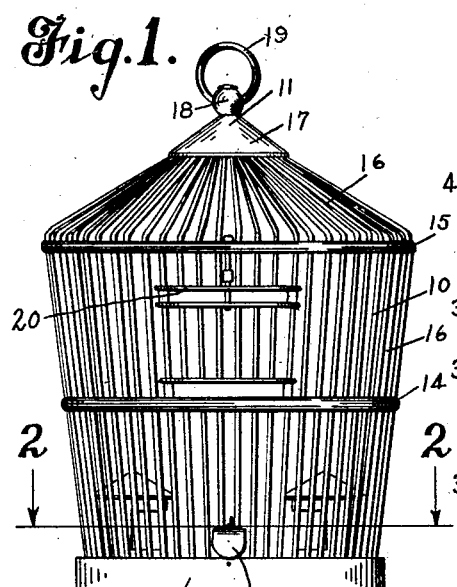
Fig. 1 is a side elevation of a bird cage embodying the features of my invention, said bird cage being constructed substantially entirely of pyralin or other cellulose esters material.

The bird cage selected to illustrate the features of this invention, generally comprises a body portion 10, a supporting means 11, and a bottom portion 12. The body portion 10 consists in integrally united horizontal rails 13, 14 and 15 and vertical wire-like rods 16. The rails 13, 14 and 15 are arranged so that rail 13 is at the bottom of the structure; rail 15 is adjacent the upper portion of the body 10, and rail 14 is disposed intermediate rails 13 and 15. The rods 16 above rail 15 are bent inwardly and converge into a cone shape, being secured beneath a cone-shaped cap 17, with which is associated a ball 18 and a cage supporting ring 19.

Intermediate the rails 14 and 15, in this instance, the cage is provided with an opening, by interrupting certain of the rods 16 at the rail 14 and terminating coincident ones that depend from the rail 15 at a cross bar 20. The cross bar 20, in this instance, is formed from flat stock, and extends between uninterrupted rods 21 and 22, which are disposed one at either side of the opening. The rods 21 and 22 are integrally united to the bar 20 by means of a solvent, after being passed through openings in the respective ends thereof.

Below the bar 20 and united integrally with each rod 21 and 22, by means of a solvent, is a spacing member 23 consisting, in this instance, of a short length of tubing. Above the rail 14 are spacing members 24, likewise consisting of other lengths of tubing which are integrally united with the rods 21 and 22, respectively.

A swingable door, composed of upper and lower horizontally disposed bars 25 and 26, having a plurality of short lengths of vertically disposed rods 27 integrally united thereto, is provided. The bars 25 and 26 at one end thereof are pivoted to the rods 21, which passes through a perforation in an end of each. The other end of each of the bars 25 and 26 is provided with a hook-shaped cut 28 in which the rod 22 is received when the door is in closed position. The door is disposed within the opening in the cage in such a manner that the upper bar 25 lies adjacent the lower ends of members 23, and the lower bar 26 lies adjacent to and rests upon the upper ends of members 24. The members 24 form supporting means for the door, and members 23 spacing means, retaining the door upon the members 24 whereby a rigid door mechanism is provided. By this structure, no strains are occasioned which tend to distort the rods 16 or rods 21 and 22, and therefore, the general symmetry of the cage is maintained.

In order to retain the door in closed position, a latch mechanism is provided. The latch mechanism, in this instance, comprises a short length of wire-like rod forming a lock pin 29, which is slidably mounted in corresponding perforations in the rail 15 and bar 20. The pin 29 is preferably disposed between the intermediate rods 16, which terminate at the bar 20. A button 30 is integrally united with the lock pin 29 in one end thereof. A short length of tubing 31 is integrally united with the pin 29 intermediate its ends, and is disposed between the bar 20 and the rail 15 in proper position to prevent the lock pin 29 from being entirely removed from the perforations in these parts. One end 32 of the lock pin 29 normally extends downwardly below the bar 20, and when in its lowermost position is adapted to enter a perforation 33 in the upper bar 25 of the door. The perforation 33 is in alignment with the pin 29 when the door is in closed position, whereby the pin 29 upon entering the same retains the door in closed position. By raising the pin 29 by means of the button 30, the door is unlatched and may readily be opened.

The cage body 10 is releasably secured to the bottom portion 12 by means of catch members 34, three of which are used in this instance. A cup-shaped member 35 forms the cage bottom, in this instance, the flange 36 of which extends substantially vertically and upwardly about the periphery thereof. The catch members 34 are disposed about the flange 36, and are secured upon the inner surface thereof by means of rivets 37, which pass through the flange 36 and the shank portion 38 of a hook-shaped member. The shank portion 38 is formed by extending the material of the hook portion 39 of this member upwardly and then turning it back and downwardly upon itself about a portion of a catch part 40, which is formed of stiff wire. By this arrangement, the portion 39 and part 40 are hingedly connected together. The hook portion 39 extends inwardly from the flange 36 and is spaced from and extends over the bottom 35. The portion 39 of each catch member forms a seat for the rail 13 to support the cage body 10.

Figure 3:
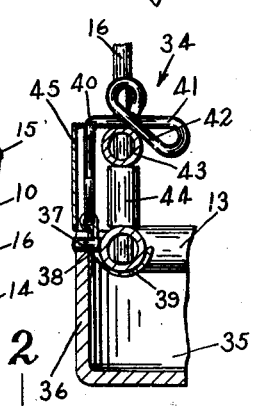
Fig. 3 is a section on line 3—3 of Fig. 2.

The catch part 40 is made from relatively stiff wire, and as shown at 41 in Fig. 3 is bent to extend horizontally at its upper end, then turned downwardly and rearwardly to be doubled upon itself, the rearwardly extending portion being inclined upwardly, as shown at 42, to cross the horizontally extending portion 41. In this manner, the part 42 which, as will be explained more fully hereinafter, engages a part of the body portion of the cage, is adjacent the free end of the latch and therefore resilient. By reason of this resilience, the part 42 will bind frictionally against the part of the cage with which it is engaged.

Figure 4:
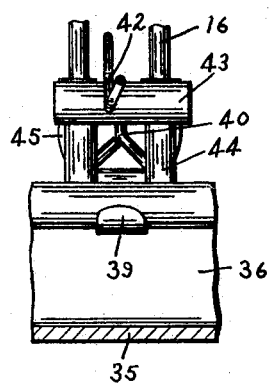
Fig. 4 is a fragmentary elevational view, showing the reverse side of the latch of the cage and cage guard, the view being taken from the inside of the cage.
Figure 2:
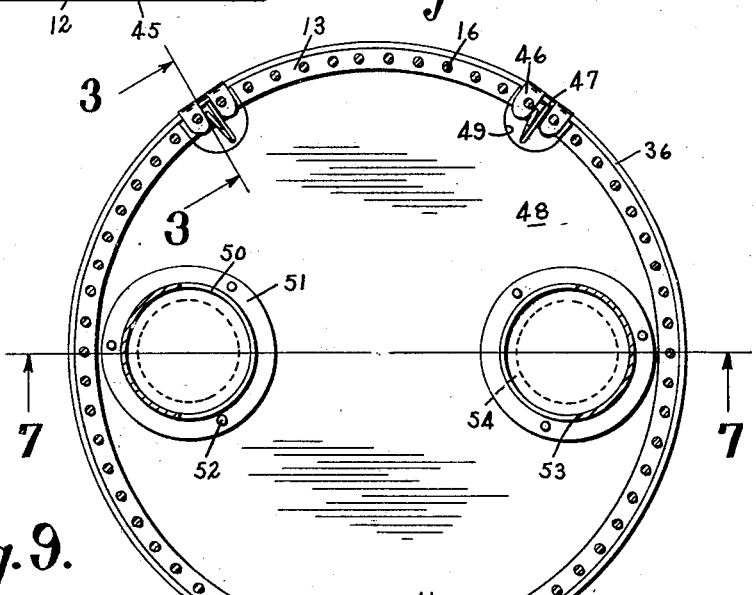
Fig. 2 is a section on line 2—2 of Fig. 1.
Figure 9:
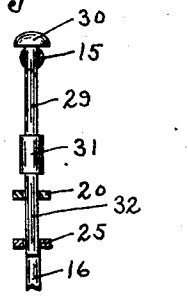
Fig. 9 is a section on line 9—9 of Fig. 5.

A short bar 43 mounted upon two adjacent vertical rods 16 and spaced from the lower rail 13 by spacing collars 44, is disposed opposite each of the catch members 40. The part 42 engages over the short bar 43 and due to its resiliency effectively holds the cage body 10 to the cage bottom 12, the rail 13 being supported in the hook portions 39. As an additional precaution to prevent any possibility of the catch portions 42 becoming accidentally released from the bar 43, catch guards 45 are provided. The catch guards 45 have horizontal portions 46 and are slidably mounted upon adjacent rods 16. The horizontal portion 46 is provided with a cut-out portion 47 to clear the parts 41 and 42 of the catch member when the guard is in its lowermost position. In this lower position, as shown in Figs. 2, 3 and 4, it will be apparent that the guard lies behind the catch member 40 and will prevent this from swinging outwardly. When it is desired to release the catch and separate the cage body 10 from the bottom 12, the guard 45 may be slipped upwardly upon the rods 16 to permit the operation of the catch members.

A flat tray or mat 48 rests upon the bottom 35, within the flange 36 and below the rail 13. The mat 48 may be removed when desired, cut-out portions 49 therein permitting the same to clear the hook portion 39 of the catch members 34. Secured to the mat 48 are feed cup holders 50.

The feed cup holders 50 are formed from tubular cellulose esters material which is flanged at one end to form an integral annular flange 51. Rivets 52 pass through the flange 51 and the mat 48 to secure these parts together. An opening 53 is cut in the periphery of each of the holders 50 to allow access to the feed cups 54, shown in dotted lines in Figs. 2 and 7. The opening 53 is disposed intermediate the ends of the holders 50 and extends about the same substantially 180 degrees, being of sufficient height to permit the insertion into the holder of the cups 54. A cone-shaped roof 55 is provided for each cup holder 50, it being integrally united thereto by the use of a solvent. The mat 48 is provided with an opening 56 which is in alignment with the interior of the cup holders 50, and permits the removal of waste material should the same collect within the holders, and further facilitates the cleansing thereof.

The specific structure of the ball 18 and the ring 19, shown in Fig. 1, and the general form of the cage body and its bottom, are described in my copending application, Serial No. 11,272, filed February 24, 1925. The specific structure of the rails 13, 14 and 15, rods 16, and guards 45, is as described in my copending application, Serial No. 167,828, filed February 12, 1927. The general method of making a cage body of pyralin or similar material of the character stated, is described and claimed in my copending application, Serial No. 181,817 filed April 7, 1927.

Aside from the use of metal within the suspension tip structure, the employment of wire catches 40, as herein described, the use of metal rivets 52, and the employment of ceramic or glass feed cups 54, all the parts of the cage are preferably but not necessarily made of pyralin, and where I have referred above to a "solvent" I have had particular reference to a suitable solvent of pyralin or like material, which is known in the art. By the use of such solvent, where different portions of a part are interconnected, they are solidly fused together to form a one-piece structure, and similar joints are formed where one part is attached to another.

While I have shown and described a preferred embodiment of my invention, it is to be understood that it is not to be limited to the details shown, being capable of modification and variation which will lie within the spirit of the invention and the scope of the appended claims.

What I claim is:

1. In a bird cage having horizontally disposed rails, vertically disposed wire-like rods, and a removable bottom portion, a plate-like tray adapted to rest upon the surface of said cage bottom and having a pair of openings therein, and tubular members secured at one end thereof to said tray and disposed over the openings therein, each of said tubular members having an opening in a side thereof to permit the entrance therein of a food cup.

2. In a bird cage having horizontally disposed rails, vertically disposed wire-like rods, and a removable bottom portion, a plate-like tray adapted to rest upon the surface of said cage bottom, and having an opening therein, and a tubular member secured at one end thereof to said tray and disposed over the opening therein.

3. In a bird cage having horizontally disposed rails, vertically disposed wire-like rods, and a removable bottom portion, a plate-like tray adapted to rest upon a surface of said cage bottom, a tubular member extending vertically from said tray over an opening therein and having a flange about an end thereof, and means to secure the flange to said tray.

4. In a bird cage having horizontally disposed rails, vertically disposed wire-like rods, and a removable bottom portion, a plate-like tray adapted to rest upon a surface of said cage bottom, and a feed cup holder mounted upon said tray, said holder comprising a tubular member having an annular flange about an end thereof to form a base therefor.

5. A bird cage, comprising a body portion having horizontally disposed rails and vertically disposed spaced apart rods, one of said rails being disposed about the periphery of the cage body at the bottom edge thereof, a cup-shaped bottom for said cage having an upwardly extending flange about the periphery thereof and being adapted to receive the lower edge of said cage body, means to support the lower edge of said cage body spaced above said cage bottom a predetermined amount, and means hinged to said supporting means to lock said cage body upon said supporting means.

6. A bird cage, comprising a body portion having horizontally disposed rails and vertically disposed spaced apart rods, one of said rails being disposed about the periphery of the cage body at the bottom edge thereof, a cup-shaped bottom for said cage having an upwardly extending flange about the periphery thereof and being adapted to receive the lower edge of said cage body, means to support the lower edge of said cage body spaced above said cage bottom a predetermined amount, said means comprising a series of tongues disposed about and secured to said flange and extending inwardly over and spaced upwardly from said cage bottom, and a catch member hinged to each of said tongues and adapted to engage said cage body to clamp the same downwardly upon said tongues.

7. In a bird cage, a plate-like tray adapted to rest upon the surface of the cage bottom, said tray having an opening therein and a tubular member secured at one end thereof to said tray and disposed over the opening therein.

8. A bird cage, comprising a body portion having horizontally disposed rails and vertically disposed spaced apart rods, one of said rails being disposed about the periphery of the cage body at the bottom edge thereof, a cup-shaped bottom for said cage having an upwardly extending flange about the periphery thereof and being adapted to receive the lower edge of said cage body, means to support the lower edge of said cage body spaced above said cage bottom a predetermined amount, and means hinged to said supporting means to lock said cage body upon said supporting means, and a plate-like tray adapted to rest upon the surface of said cage bottom, said tray having an opening therein, and a tubular member secured at one end thereof to said tray and disposed over the opening therein.

9. In a bird cage, having vertically disposed spaced apart rods, and horizontally disposed rails, said cage having an opening therein formed by interrupting a number of the vertically disposed rods intermediate two of said rails, and a door to close said opening, said door having upper and lower bars with one end of each bar being pivotally secured to the uninterrupted rod defining one side of the aforesaid opening, and the other end thereof engaging the uninterrupted rod defining the other side of the aforesaid opening when said door is closed, a cross-bar disposed above said door and defining the upper edge of the aforesaid opening, and a verically slidable pin passed through the upper rail and said cross-bar and adapted to enter a perforation in the upper bar of said door, when said door is closed, to retain it in such position, said pin having a head thereon to limit its downward movement and being provided with means to limit its upward movement out of said cross-bar.

In witness whereof, I have hereunto set my hand this 25th day of March, 1927.

ROSS L. TULLIS.